(12) United States Patent
Porth et al.

(10) Patent No.: US 6,443,019 B1
(45) Date of Patent: Sep. 3, 2002

(54) TORQUE SENSOR AND METHOD OF PRODUCING A TORQUE-DEPENDENT SIGNAL

(75) Inventors: Wolfgang Porth, Frankfurt; Lother Gier, Bad Nauheim, both of (DE)

(73) Assignee: Siemens Corporation (DE)

( * ) Notice: Subject to any disclaimer, the term of this patent is extended or adjusted under 35 U.S.C. 154(b) by 0 days.

(21) Appl. No.: 09/360,605

(22) Filed: Jul. 26, 1999

(30) Foreign Application Priority Data

Jul. 24, 1998 (DE) ................................. 198 33 358

(51) Int. Cl.[7] .............................. G01L 3/00; B25B 23/14
(52) U.S. Cl. ................................. 73/862.08; 73/862.24; 73/862
(58) Field of Search ...................... 73/862.331, 862.332, 73/862.333, 862.335, 862.325, 862, 862.08, 862.24

(56) References Cited

U.S. PATENT DOCUMENTS 4,283,764 A * 8/1981 Crum et al. ............... 31/568.1
4,319,494 A * 3/1982 Marcinkiewicz .......... 73/862.23
4,660,671 A * 4/1987 Behr et al. .................... 180/446
5,307,690 A * 5/1994 Hanazawa ............... 73/862.333
5,360,583 A * 11/1994 Hazelden ...................... 702/41
6,354,156 B1 * 3/2002 Porth et al. ............... 73/862.08

FOREIGN PATENT DOCUMENTS

EP 0555987 3/1993
JP 03103737 * 4/1991 ............. G01L/3/10

* cited by examiner

Primary Examiner—Benjamin R. Fuller
Assistant Examiner—Andre Allen
(74) Attorney, Agent, or Firm—Mayer, Brown, Rowe & Maw

(57) ABSTRACT

A torque sensor has a generator whose output signal is a function of a torque, a second signal generator, whose output signal changes in an opposite direction as a function of the torque, and an evaluation device which has a summing means which is connected to the two signal generators. For this purpose, connected to an integrator whose output is connected to a first input of a comparator whose second input is connected to the output of the comparator reset input of the integrator output of the torque sensor.

12 Claims, 4 Drawing Sheets

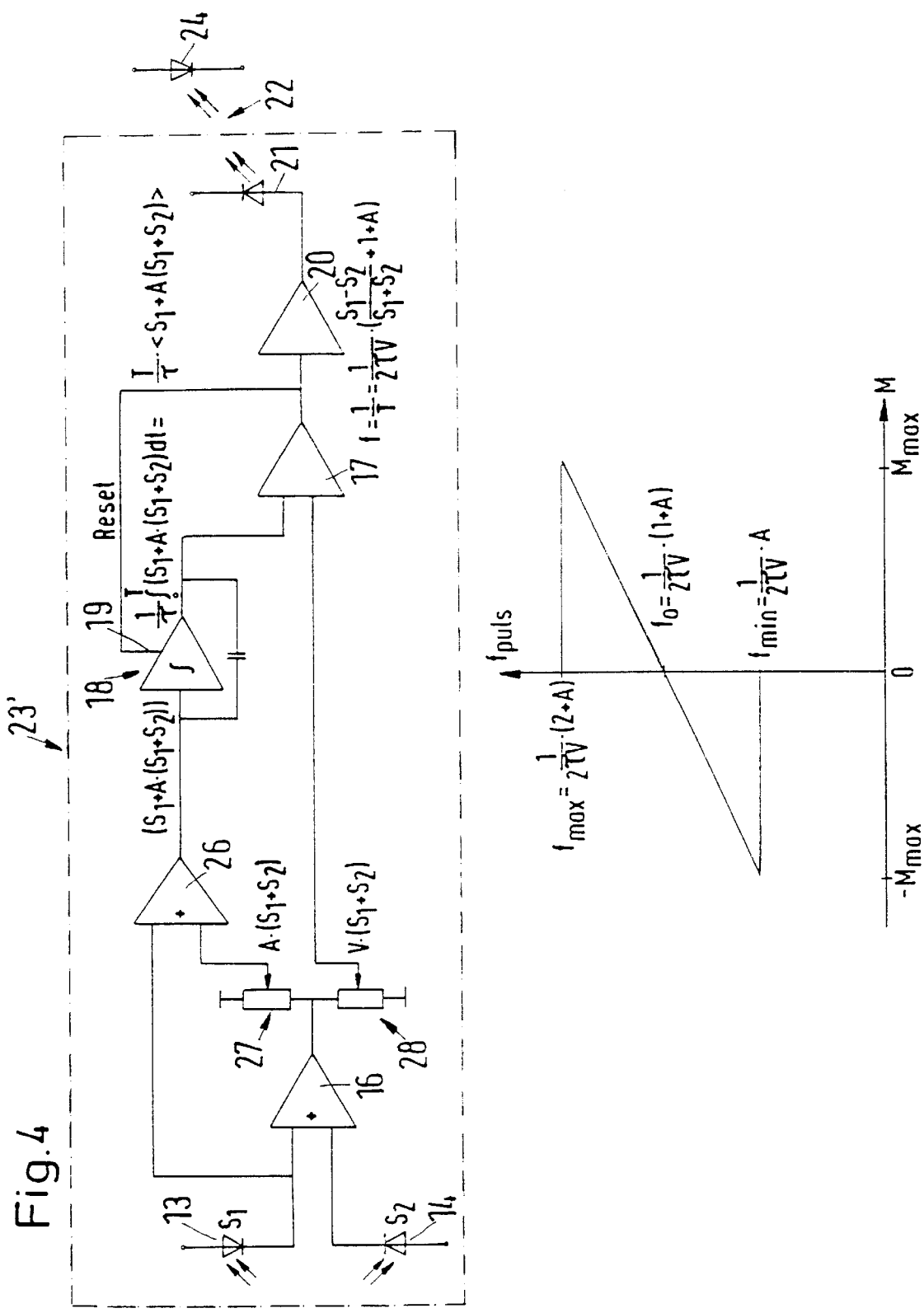

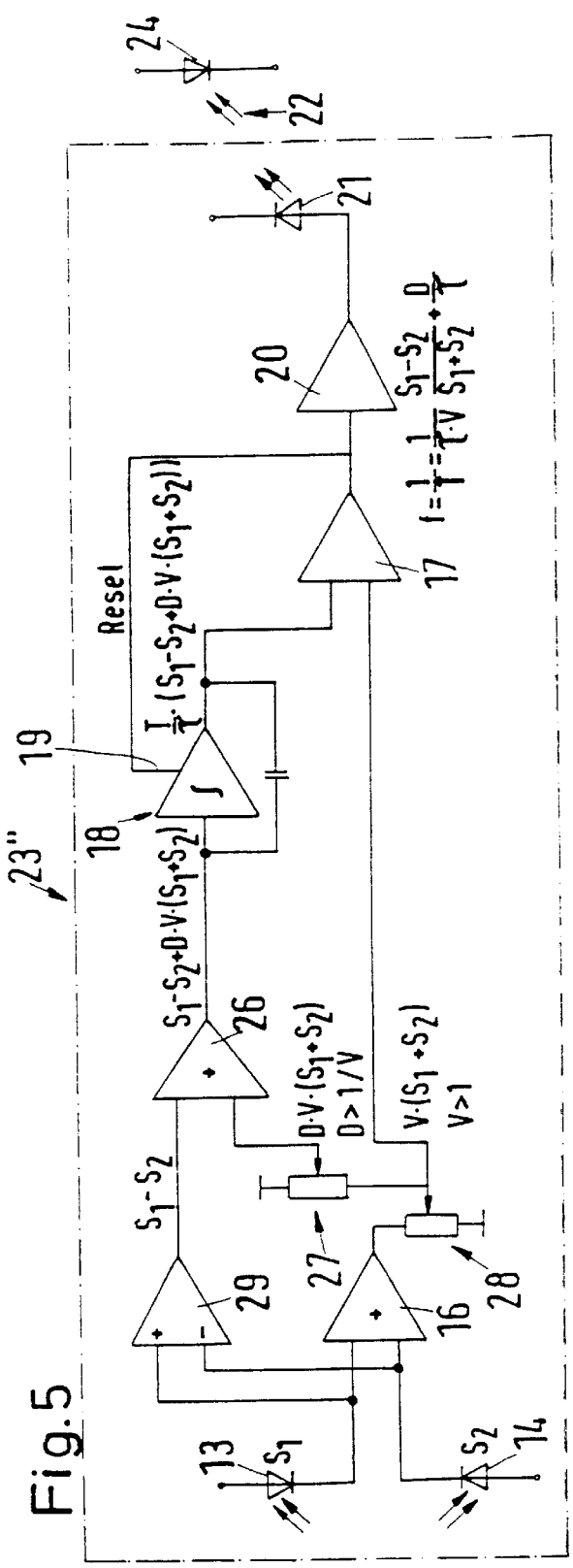
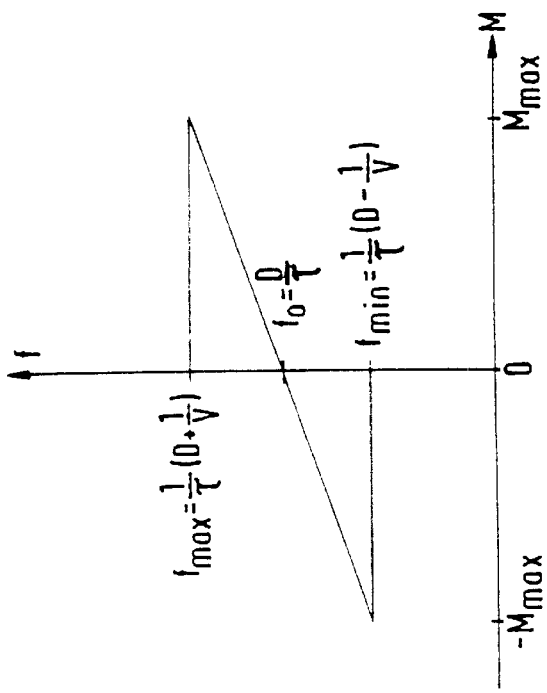

TORQUE SENSOR AND METHOD OF PRODUCING A TORQUE-DEPENDENT SIGNAL

BACKGROUND OF THE INVENTION

1. Field of the Invention

The invention relates to a torque sensor having a first signal generator, whose output signal changes as a function of a torque, a second signal generator, whose output signal changes in the opposite direction as a function of the torque, and an evaluation device which has a summing device which is connected to both signal generators. In addition, the invention relates to a method of producing a torque-dependent signal from output signals of two signal generators with opposed signal waveforms, in which the sum of the output signals is formed.

2. Description of the Related Art

A torque sensor and a method of producing a torque-dependent signal of the above-mentioned type are disclosed by EP 0 555 987 B1. The torque sensor disclosed is used in a power-assisted vehicle steering system. It is arranged between a steering wheel and a steering gearbox. The steered wheels are acted on by a motor which is activated in such a way that the torque determined by the torque sensor becomes as small as possible. The signal generators operate optically. A light source radiates through an aperture arrangement onto a photoelectric region which is arranged at one end of a torsion rod. The aperture arrangement is connected to the other end of the torsion rod. When a torque is applied, the torsion rod twists somewhat. Consequently, the aperture is displaced with respect to the photoelectric pickups, so that the first pickup receives a greater amount of light and the second pickup receives a smaller amount of light than in the neutral position. Consequently, the output signals change. The difference between the output signals is divided by the sum of the output signals, in order to achieve the situation in which the torque-dependent signal becomes independent of changes in the light intensity or of age-induced changes in the components.

A different torque sensor is disclosed by EP 0 765 795 A2. Here use is likewise made of two signal generators, whose output signals vary in opposite directions as a function of position. The signal generators are fed by a supply voltage. The supply voltage is then controlled in such a way that the sum of the two output signals is constant. This torque sensor is also used for operating a power-assisted steering system.

SUMMARY OF THE INVENTION

The present invention provides a system and method for obtaining a torque signal in a simple way.

In a torque sensor of the type mentioned at the beginning, this object is achieved by the first signal generator being connected to an integrator whose output is connected to a first input of a comparator whose second input is connected to the summing device, the output of the comparator being connected to a reset input of the integrator and to a signal output from the torque sensor.

In this configuration, both a controller which has to keep a supply voltage to a constant value, and a divider which is used for normalization, are dispensed with. Nevertheless, a torque-dependent signal is available at the output of the comparator. In this case, its frequency is torque-dependent. The integrator integrates the integrates the output signal of the first signal generator until this is equal to the sum of the two output signals. As long as the condition still has not been satisfied, the output of the comparator has a first state, for example 5 V or "high". As soon as the output voltage has reached the voltage sum of the output signals, the output of the comparator goes to "low" or to 0 V. Accordingly, one pulse is produced at each changeover in a specific direction. At this changeover, the comparator then resets the integrator, so that the integration can begin from the start. It is obvious that the frequency depends on the magnitude of the output signal of the first signal generator. In the case of a greater signal, the frequency is higher, since the integration time is shorter, and in the case of a smaller signal the frequency is correspondingly lower. Since the sum of the output signals is used as a criterion for the changing over of the comparator, far-reaching independence from similar changes in these signals is achieved, these changes being caused by components, for example.

In a preferred configuration, the output of the comparator is connected to a pulse generator. At the changeover, the pulse generator in each case produces a pulse of predetermined length. Pulses of this type can subsequently be processed better.

The summing device is preferably constructed as a summing amplifier. It therefore not only sums the output signals of the two signal generators but further amplifies this sum. In this way, longer integration times are achieved and, as a result, somewhat lower frequencies at the output of the comparator. Furthermore, a further influencing variable for configuring the frequency is obtained via the selection of the gain.

In this case, it is particularly preferable for the gain of the summing amplifier and the time constant of the integrator to be selected such that, given equality between the output signals, a signal at a frequency of at least 3 kHz is set at the output of the comparator. If the output signals are equal, there is no torque. A frequency of at least 3 kHz may be processed easily. It still allows sufficient latitude, upward and downward, to be able to evaluate torque changes upward and downward.

The signal output is preferably connected to a wire-free signal transmission path. A wire-free signal transmission path of this type may operate optically or with radio signals, for example. Since the output signal contains the information in the frequency, such a transmission is generally possible without problems. The wire-free signal transmission path has the advantage that it can be used in rotating components as well. This case occurs primarily in steering systems.

The input of the integrator is preferably connected to a second summing device, whose first input is connected to the first signal generator and whose second input is connected to the output of the first summing device. With this configuration, it is possible to implement an offset shift of the frequency, that is to say the midfrequency which is produced without any torque can be raised, so that, even at extreme values of the torque, the output frequency is sufficiently high to permit short measuring cycles.

A proportionality element is preferably arranged between the two summing devices. This proportionality element does not have to be constructed as a discrete component. It can also be formed by a feedback means with which the gain of the summing device is changed. The proportionality factor of the proportionality element is included directly in the offset by which the frequency is shifted. By means of an appropriate selection of this proportionality factor, the desired mid-frequency can therefore be fixed relatively accurately.

A second proportionality element is preferably arranged between the first summing device and the comparator. The same applies here with regard to the construction as for the first proportionality element, that is to say it can also be formed by appropriate feedback of an amplifier. Using this second proportionality element, the slope of the frequency against torque may be adjusted. It is thus possible to influence the sensitivity of the sensor.

In a particularly preferred configuration, provision is made for the first input of the second summing device to be connected to the output of a difference-forming unit whose two inputs are connected to the two signal generators, and for the second input of the second summing device to be connected to the input of the comparator via a proportionality element, the input signal of the comparator being formed from the sum signal amplified by a gain, and the proportionality factor of the proportionality element being less than 1, but greater than the reciprocal of the gain. In this configuration, the frequency slope and the frequency offset can be set independently of each other.

The second signal generator is preferably connected to a second integrator having a second comparator downstream, a monitoring device being provided which checks the sum of the frequencies at the outputs of the comparators for constancy. This configuration is particularly advantageous when used in safety-relevant applications. The functioning of the circuit is capable of diagnosis. Since the output signals from the signal generators run in complementary fashion to each other, the sum of the frequencies at the output of the comparators remains constant and equal to twice the frequency of the zero-torque signal. Relatively small fluctuations are of course permitted. If, however, the frequency sum leaves a predetermined corridor, this is a relatively sure sign of the occurrence of a fault.

In the case of a method of the type mentioned at the beginning, the object is achieved by an output signal being integrated until the integrated signal corresponds to the sum of the output signals.

As explained above in conjunction with the sensor, in this configuration a signal is obtained whose frequency is proportional to the torque. By selecting the sum of the output signals as a reference variable for the end of the integration, a large degree of independence is obtained from synchronous changes in the individual output signals.

BRIEF DESCRIPTION OF THE DRAWINGS

The invention will be described in more detail below using preferred exemplary embodiments in conjunction with the drawing, in which:

FIG. 4 shows a modified embodiment of the circuit arrangement; and

FIG. 5 shows a further modification of the circuit arrangement.

DETAILED DESCRIPTION OF THE PREFERRED EMBODIMENTS

Figure 1:
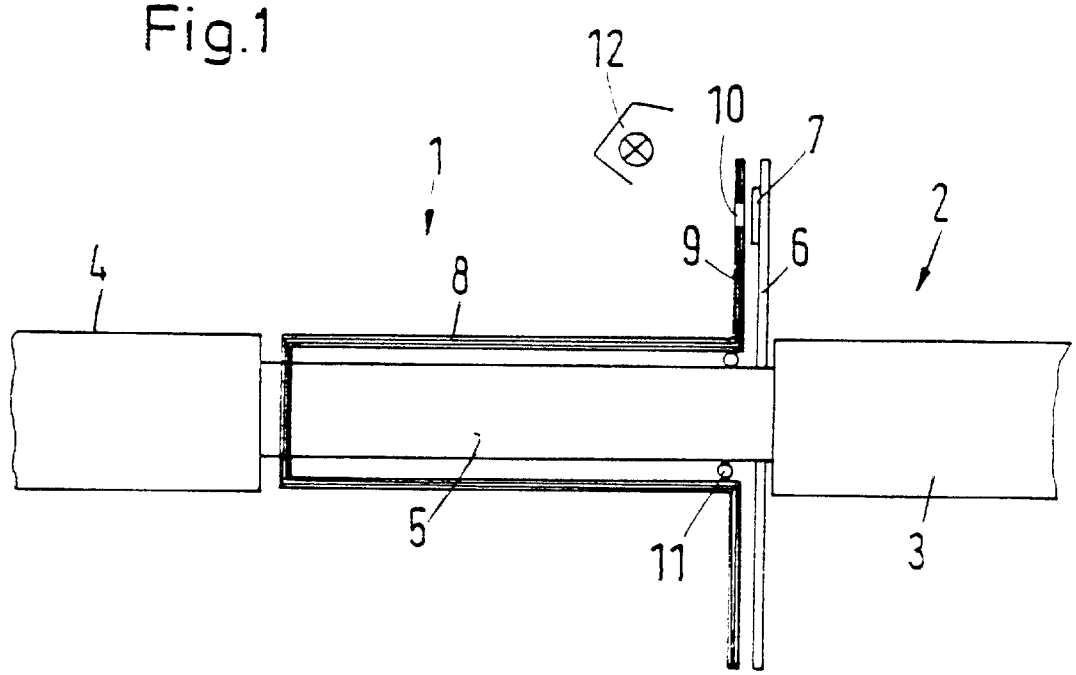
FIG. 1 shows a schematic cross-sectional view of the mechanical construction of a torque sensor.

In the present exemplary embodiment, a torque sensor 1 is mounted on a steering column 2 of a motor vehicle, only a detail of said column being illustrated here. The steering column 2 has a first section 3, which is connected to the steering wheel, and a second section 4, which leads to a steering gearbox. Arranged between these, as a measuring shaft 5, is a torsion rod, which has a reduced diameter by comparison with the two sections 3, 4 of the steering column 2. When a torque is applied to the steering column 2 by the steering wheel 4, the measuring shaft 5 twists somewhat.

Arranged at one end of the measuring shaft 5 is a plate 6 having a detector arrangement 7. Fastened to the other end of the measuring shaft 5 is a sleeve 8, which, on its side adjacent to the plate 6, likewise bears a plate 9 which has approximately the same diameter as the plate 6. Located in the plate 9 is an aperture 10, which is located opposite the detector arrangement 7. The sleeve 8 is supported on the measuring shaft 5 with the aid of bearings 11.

A lamp 12, which is illustrated in schematic form, can also be formed by light-emitting diodes or the like and is generally arranged closer to the plate 9, illuminates the detector arrangement 7 through the aperture 10.

Figure 2:
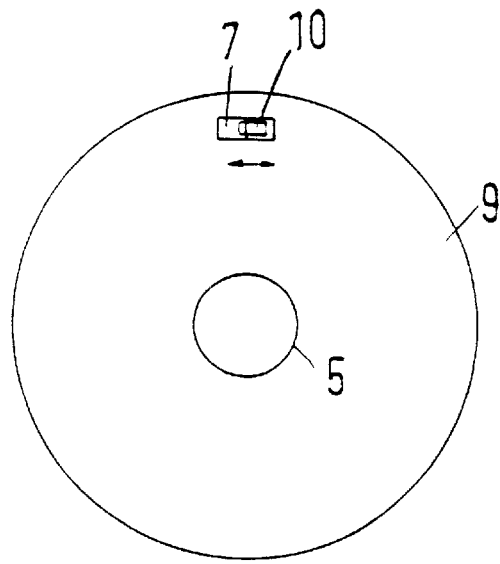
FIG. 2 shows a plan view of the torque sensor.
Figure 2A:
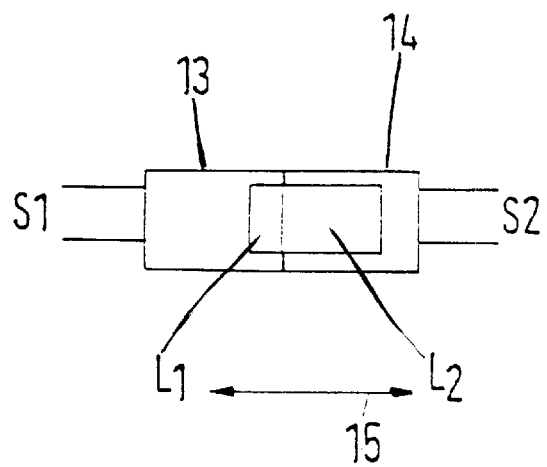
FIG. 2a shows an enlarged detail from FIG. 2.

In FIG. 2, the detector arrangement 7 is illustrated on the plate 6. FIG. 2a shows an enlarged view.

The detector arrangement 7 comprises two photoreceivers 13, 14, which produce output signals Si, S2 as a function of the luminous flux L1, L2 which falls on them. Accordingly, the photoreceivers 13, 14 are also referred to as signal generators.

Depending on the magnitude and the direction of the torque with which the steering column 2 is loaded, the aperture 10 is displaced over the photoreceivers 13, 14 in the direction of the double arrow 15. Given otherwise identical conditions, for example an identical construction, the signal S1 therefore decreases to the same extent as the signal S2 increases. From the signals S1 and S2 it is therefore possible to infer the applied torque via the change in the positions of the plates 6, 9 in relation to each other.

Figure 3:
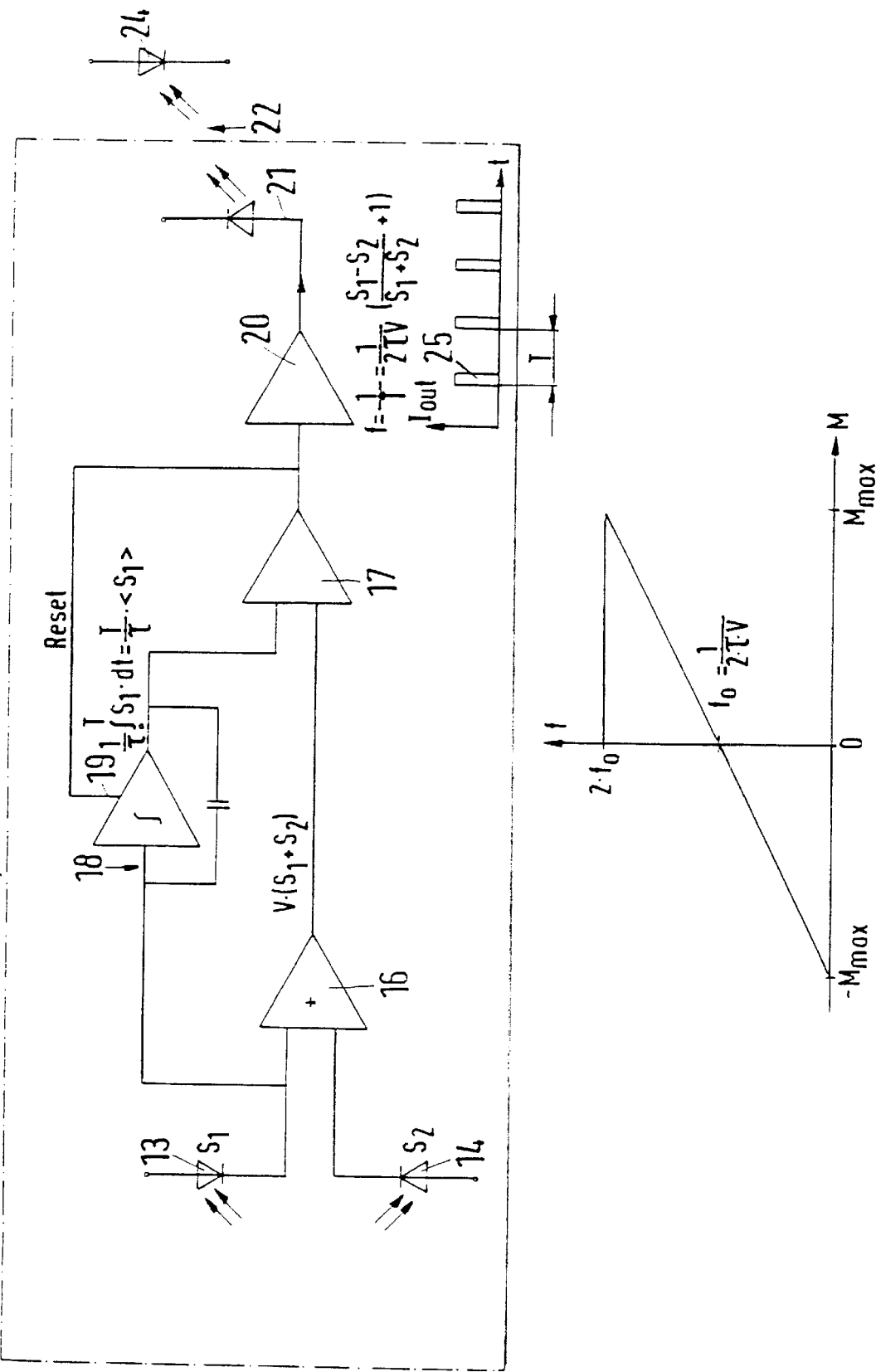
FIG. 3 shows a circuit arrangement for producing a torque-dependent signal.

FIG. 3 shows a circuit arrangement 16 with which the signals S1, S2 can be used to obtain an output signal whose frequency f is proportional to the applied torque.

The two signal generators 13, 14 are connected to an adder 16, whose output is connected to a comparator 17. The adder 16 is constructed as a summing amplifier having a gain V. The signal generator 13 is also connected to the input of an integrator 18, whose output is connected to the other input of the comparator 17. The output of the comparator 17 is firstly led to a reset input 19 of the integrator 18, and is secondly connected to the input of a pulse generator 20. The pulse generator 20 is connected to a transmitter 21 of a wire-free transmission path 22, via which the output signal of the circuit arrangement 23 can be transmitted to a receiver 24. For example, the transmitter can be constructed as an infrared light-emitting diode, and the receiver 24 as a photoreceiver. However, it is also possible to transmit the signals in a wire-free manner with the aid of other electromagnetic waves. It is therefore possible, even given a relatively high rotation of the steering column 2, such as 2, such as occurs when steering a motor vehicle, to transmit the torque signals without line problems.

The circuit arrangement 23 operates as follows: The integrator 18 has a time constant τ. If it is assumed that the signal S1 of that the signal S1 of the signal generator 13 is constant over a sufficiently long time, then the output signal of the integrator is equal to $(T/\tau) \cdot S1$. Hence, the integrator output voltage is proportional to the photo voltage and thus to the luminous flux L1 on the photoreceiver 13 and to the integration time T, if $u_{int}$ was set to the value 0 at the beginning of the integration.

The amplified voltage sum V·(S1+S2) is fed to the other input of the comparator 17. As long as the voltage sum is greater than the integrator output voltage, the comparator output is logic high, for example at 5 V. It changes over when the integrator output voltage is equal to the amplified voltage sum. This may be expressed mathematically in the following way:

$$T/\tau S1 = V \cdot (S1+S2)$$

$$T = V \cdot \tau \cdot \frac{S1+S2}{S1}$$

When the comparator changes over, the output voltage becomes logic low, for example 0 V. At this instant, the integrator is reset and the integration begins from the start. A signal at a frequency f=1/T appears at the output of the comparator 17.

$$f = \frac{1}{T} = \frac{1}{\tau \cdot V} \frac{S1}{S1+S2} =$$
$$\frac{1}{2\tau V} \frac{2 \cdot S1}{S1+S2} = \frac{1}{2\tau V} \frac{S-S2+S1+S2}{S1+S2} = \frac{1}{2\tau V}\left(\frac{S1-S2}{S1+S2}+1\right)$$

This frequency is plotted graphically as a function of the torque M.

The pulse generator 20 generates current pulses 25 at this frequency, and these are forwarded to the transmitter 21.

If V=10 is set for the gain, and τ=10 μs is set for the time constant, the result is a mid-frequency $f_o$ of 5 kHz. By appropriate selection of the two variables, it is possible to vary the mid-frequency, that is to say the frequency which results when there is no torque present.

However, in this configuration very small frequencies result at large negative torques, and at these frequencies the cycle or evaluation times can become very long.

FIG. 4 shows a changed configuration, in which a frequency offset is achieved.

Parts identical to those in FIG. 3 are provided with the same reference symbols.

A second adder 26, whose output is connected to the input of the integrator 18, has been added. The second adder 26 may likewise have a gain, but this has been left out for the following examination.

One input of the adder 26 is connected one input of the adder 26 is connected to the signal generator 13. The other input of the adder 26 is connected to a first proportionality element 27, which is represented here as an ohmic resistor with a center tap. For its part, the proportionality element 27 is connected to the output of the first adder 16.

The term proportionality element is to be understood here in functional terms. It supplies the voltage sum S1+S2 with a proportionality factor which may be less than or greater than 1. Consequently, the proportionality element can also be formed by feedback on an operational amplifier which forms the first adder 16. In the present case, said proportionality factor is greater than 1.

In a similar way, the input of the comparator 17 is connected to the output of the first adder 16 via a second proportionality element 28 having a gain V.

The condition for changing over the comparator is now $$T/\tau \cdot (S1+A \cdot (S1+S2)) = V(S1+S2)$$

In a manner similar to the transformation indicated above, this then results in $$f = \frac{1}{T} = \frac{1}{2\tau V} \cdot \left(\frac{S1-S2}{S2+S2}+1+A\right)$$

The resulting dependence of the frequency f on the torque M is plotted in the graph under the circuit arrangement 23'.

If, for example, the gain is set to be V=10, the time constant is set to be τ=10 μs and the gain A is set to be A=2, then the result for the minimum frequency is $f_{min}$=10 kHz, for the maximum frequency it is $f_{max}$=20 kHz, and for the mid-frequency it is f=15 kHz.

FIG. 5 shows a further circuit arrangement 23", with which it is possible to change not only the frequency offset but also the slope of the frequency against torque, to be precise independently of the offset.

Identical parts are provided with the same reference symbols as in FIG. 4.

The first input of the second adder 26 is now no longer fed with the output signal of the first signal generator 13, but with the difference S1–S2 of the output signals of the two signal generators 13, 14.

In addition, the first proportionality element is no longer connected to the output of the first adder 16 directly, but to the input of the comparator 17, so that it not only provides the sum S1+S2 with a proportionality factor P, but also the amplified sum V·(S1+S2).

The following applies to the gain or proportionality factors D, V:

$$1/V < 1 D < 1$$

The changeover condition for the comparator 17 is T/τ· (S1–S2+D·V·(S1+S2))=V (S1+S2). From this it follows that:

$$f = \frac{1}{T} = \frac{1}{\tau \cdot V} \cdot \frac{S1-S2}{S2+S2} + \frac{D}{\tau}$$

The resulting variation of the frequency f against the torque M is plotted in the graph underneath the circuit arrangement 23". This also reveals the limiting arrangement 23". This also reveals the limiting values.

In a manner which is not specifically illustrated, it is now also possible to provide the output of the second signal generator 14 with an integrator and a comparator for monitoring or self-diagnosis purposes. If appropriate, the adder 16 can be used jointly for both signal generators 13, 14. However, it is also possible to process the output signal S2 of the second signal generator 14 further in an identical circuit.

Since the signal S1 runs in complementary fashion to the signal S2, the result for the second signal S2 is then a frequency f2, it being true that f1+f2=2fo, that is to say the frequency sum is equal to twice the frequency of the zero-torque signal.

What is claimed is:

1. A torque sensor comprising:
    a first signal generator, having an output signal that changes in a first direction as a function of a torque,
    a second signal generator, having output signal that changes in a second direction opposite to said first direction as a function of the torque, and
    an evaluation circuit which is comprised of a summing device having a first input connected to the first signal generator and a second input connected to the second signal generator, which provides an output summing the first and second inputs, wherein the first signal generator is connected to an integrator having output an connected to a first input of a comparator having second input an connected to the output of the summing device, the output of the comparator being connected to a reset input of the integrator and to a signal output from the torque sensor, wherein the integrator is reset at a frequency proportional to the torque.

2. The sensor as claimed in claim 1, wherein the output of the comparator is connected to a pulse generator.

3. The sensor as claimed in claim 1, wherein the summing device is a summing amplifier.

4. The sensor as claimed in claim 3, wherein a gain of the summing amplifier and a time constant of the integrator are selected such that, given equality between the output signals, a signal at a frequency of at least 3 kHz is provided at the output of the comparator.

5. The sensor as claimed in claim 1, wherein the signal output is connected to a wireless signal transmission path.

6. The sensor as claimed in claim 1, wherein the input of the integrator is connected to a further summing device, whose first input is connected to the first signal generator and whose second input is connected to the output of the first summing device.

7. The sensor as claimed in claim 6, wherein a proportionality element is arranged between the two summing devices.

8. The sensor as claimed in claim 7, wherein a second proportionality element is arranged between the first summing device and the comparator.

9. The sensor as claimed in claim 6, wherein the first input of the second summing device is connected to the output of a difference-forming unit, whose two inputs are connected to the two signal generators, and wherein the second input of the second summing device is connected to the input of the comparator via a proportionality element, the input signal of the comparator being formed from the sum signal amplified by a gain, and a proportionality factor of the proportionality element being less than 1 but greater than the reciprocal of the gain.

10. The sensor as claimed in one of claim 1, wherein the second signal generator is connected to a second integrator having a second comparator and further comprising, a monitoring means which checks a sum of the frequencies at the outputs of the comparators for constancy.

11. A method of producing a torque-dependent signal comprising the steps of:

generating output signals from first and second signal generators having respective output signals that vary in opposite directions as a function of an applied torque;

summing the output signals;

integrating at least an output signal until the integrated signal corresponds to the sum of the output signals; and measuring the frequency of the integration of the output signal defines the torque dependent signal.

12. The method of claim 11 further comprising a step of generating an output pulse when the integrated output equals the sum of the output signals.

* * * * *